US009875723B2

(12) United States Patent
Ju et al.

(10) Patent No.: US 9,875,723 B2
(45) Date of Patent: Jan. 23, 2018

(54) DATA PROCESSING APPARATUS FOR TRANSMITTING/RECEIVING RANDOMLY ACCESSIBLE COMPRESSED PIXEL DATA GROUPS OVER DISPLAY INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 165 days.

(21) Appl. No.: 14/335,950

(22) Filed: Jul. 21, 2014

(65) Prior Publication Data
US 2015/0049097 A1    Feb. 19, 2015

Related U.S. Application Data

(60) Provisional application No. 61/865,345, filed on Aug. 13, 2013.

(51) Int. Cl.
*G09G 5/00* (2006.01)
*G06T 1/60* (2006.01)
*G06T 9/00* (2006.01)
*H04N 19/42* (2014.01)
*G09G 3/20* (2006.01)
*H04N 21/845* (2011.01)

(52) U.S. Cl.
CPC ............... *G09G 5/006* (2013.01); *G06T 1/60* (2013.01); *G06T 9/00* (2013.01); *G09G 3/20* (2013.01); *G09G 3/2096* (2013.01); *H04N 19/42* (2014.11); *G09G 2310/027* (2013.01); *G09G 2310/0218* (2013.01); *G09G 2310/0297* (2013.01); *G09G 2340/02* (2013.01); *G09G 2350/00* (2013.01); *G09G 2360/08* (2013.01); *G09G 2370/04* (2013.01); *G09G 2370/08* (2013.01); *G09G 2370/10* (2013.01); *H04N 21/8455* (2013.01)

(58) Field of Classification Search
USPC ........................................................ 345/520
See application file for complete search history.

(56) References Cited

U.S. PATENT DOCUMENTS

| 5,668,948 | A | 9/1997 | Belknap |
| 5,809,176 | A | 9/1998 | Yajima |
| 9,460,525 | B2 * | 10/2016 | Zhong ...................... G06T 9/00 |

(Continued)

FOREIGN PATENT DOCUMENTS

| CN | 1114489 A | 1/1996 |
| CN | 1571986 A | 1/2005 |

(Continued)

*Primary Examiner* — Kimbinh T Nguyen
(74) *Attorney, Agent, or Firm* — Winston Hsu

(57) ABSTRACT

A data processing apparatus includes a compressor and an output interface. The compressor generates a plurality of compressed pixel data groups by compressing pixel data of a plurality of pixels of a picture based on a pixel data grouping setting of the picture. The output interface packs the compressed pixel data groups into an output bitstream, records indication information in the output bitstream, and outputs the output bitstream via a display interface. The indication information is indicative of at least one boundary between consecutive compressed pixel data groups packed.

11 Claims, 13 Drawing Sheets

(56) References Cited

U.S. PATENT DOCUMENTS

| | | |
|---|---|---|
| 2001/0014121 A1 | 8/2001 | Kaye |
| 2004/0228534 A1 | 11/2004 | Sakuyama |
| 2008/0199091 A1 | 8/2008 | Srinivasan |
| 2008/0253450 A1* | 10/2008 | Lin .................. H04N 19/15 375/240.04 |
| 2008/0284621 A1 | 11/2008 | Diab |
| 2009/0002507 A1 | 1/2009 | Fukuhara |
| 2009/0041112 A1* | 2/2009 | Lee .................. G09G 3/3611 375/240.01 |
| 2010/0254616 A1 | 10/2010 | Abdo |
| 2011/0310955 A1* | 12/2011 | Zhang ................ H04N 19/172 375/240.02 |
| 2012/0106650 A1* | 5/2012 | Siegman ............ H04N 19/176 375/240.24 |
| 2012/0121012 A1* | 5/2012 | Shiodera .......... H04N 19/00121 375/240.03 |
| 2012/0163453 A1* | 6/2012 | Horowitz ............ H04N 19/137 375/240.12 |
| 2012/0195510 A1* | 8/2012 | Taniguchi ............ H04N 19/12 382/232 |
| 2013/0010864 A1 | 1/2013 | Teng |
| 2013/0100121 A1* | 4/2013 | Cha .................. H04N 19/597 345/419 |
| 2013/0114735 A1* | 5/2013 | Wang ................ H04N 19/176 375/240.23 |
| 2014/0086306 A1* | 3/2014 | Esenlik .............. H04N 19/46 375/240.02 |
| 2014/0086333 A1* | 3/2014 | Wang ................ H04N 19/70 375/240.25 |
| 2014/0267326 A1* | 9/2014 | Stanley .............. G06F 3/14 345/522 |
| 2014/0362098 A1* | 12/2014 | Kerofsky ............ G06T 1/60 345/547 |

FOREIGN PATENT DOCUMENTS

| | | |
|---|---|---|
| CN | 1725861 A | 1/2006 |
| CN | 1914915 A | 2/2007 |
| CN | 100369080 C | 2/2008 |
| CN | 101411199 A | 4/2009 |
| CN | 101616326 A | 12/2009 |
| CN | 101971625 A | 2/2011 |
| CN | 102196268 A | 9/2011 |
| CN | 102542969 A | 7/2012 |
| CN | 102754448 A | 10/2012 |
| CN | 102801981 A | 11/2012 |
| CN | 102804785 A | 11/2012 |
| JP | H10304356 A | 11/1998 |
| JP | 2007013534 A | 1/2007 |
| JP | 2011015140 A | 1/2011 |
| WO | 2006066062 A2 | 6/2006 |
| WO | 2012172393 A1 | 12/2012 |

* cited by examiner

DATA PROCESSING APPARATUS FOR TRANSMITTING/RECEIVING RANDOMLY ACCESSIBLE COMPRESSED PIXEL DATA GROUPS OVER DISPLAY INTERFACE AND RELATED DATA PROCESSING METHOD

CROSS REFERENCE TO RELATED APPLICATIONS

This application claims the benefit of U.S. provisional application No. 61/865,345, filed on Aug. 13, 2013 and incorporated herein by reference.

BACKGROUND

The disclosed embodiments of the present invention relate to transmitting and receiving data over a display interface, and more particularly, to a data processing apparatus for transmitting/receiving randomly accessible compressed pixel data groups of one picture over a display interface and a related data processing method.

A display interface is disposed between a first chip and a second chip to transmit display data from the first chip to the second chip for further processing. For example, the first chip may be a host application processor, and the second chip may be a driver integrated circuit (IC). The display data may be single view data for two-dimensional (2D) display or multiple view data for three-dimensional (3D) display. When a display panel supports a higher display resolution, 2D/3D display with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface. Thus, there is a need for an innovative design which can effectively reduce the power consumption of the display interface.

SUMMARY

In accordance with exemplary embodiments of the present invention, a data processing apparatus for transmitting/receiving randomly accessible compressed pixel data groups of one picture over a display interface and a related data processing method are proposed.

According to a first aspect of the present invention, an exemplary data processing apparatus is disclosed. The exemplary data processing apparatus includes a compressor and an output interface. The compressor is configured to generate a plurality of compressed pixel data groups by compressing pixel data of a plurality of pixels of a picture based on a pixel data grouping setting of the picture. The output interface is configured to pack the compressed pixel data groups into an output bitstream, record indication information in the output bitstream, and output the output bitstream via a display interface, wherein the indication information is indicative of at least one boundary between consecutive compressed pixel data groups packed.

According to a second aspect of the present invention, an exemplary data processing apparatus is disclosed. The exemplary data processing apparatus includes a compressor, a first output interface and a second output interface. The compressor is configured to generate a plurality of compressed pixel data groups by compressing pixel data of a plurality of pixels of a picture based on a pixel data grouping setting of the picture. The first output interface is configured to pack the compressed pixel data groups into an output bitstream, and output the output bitstream via a display interface. The second output interface is configured to transmit indication information via at least one out-of-band channel different from the display interface, wherein the indication information is indicative of at least one boundary between consecutive compressed pixel data groups packed in the output bitstream.

According to a third aspect of the present invention, an exemplary data processing apparatus is disclosed. The exemplary data processing apparatus includes a compressor, a rate controller, and an output interface. The compressor is configured to generate a plurality of compressed pixel data groups by compressing pixel data of a plurality of pixels of a picture based on a pixel data grouping setting of the picture. The rate controller is configured to perform bit-rate control. The output interface is configured to pack the compressed pixel data groups into an output bitstream, and output the output bitstream via a display interface. At least a portion of at least one of consecutive compressed pixel data groups packed in the output bitstream is generated under a fixed compression ratio controlled by the rate controller.

According to a fourth aspect of the present invention, an exemplary data processing apparatus is disclosed. The exemplary data processing apparatus includes an input interface, a controller, and a de-compressor. The input interface is configured to receive an input bitstream from a display interface, un-pack the input bitstream into a plurality of compressed pixel data groups of a picture, and parse indication information included in the input bitstream, wherein the indication information is indicative of at least one boundary between consecutive compressed pixel data groups packed in the input bitstream. The controller is configured to refer to the indication information to identify a compressed pixel data group from the compressed pixel data groups. The de-compressor is configured to de-compress the compressed pixel data group to generate a de-compressed pixel data group.

According to a fifth aspect of the present invention, an exemplary data processing apparatus is disclosed. The exemplary data processing apparatus includes a first input interface, a second input interface, a controller, and a de-compressor. The first input interface is configured to receive an input bitstream from a display interface, and un-pack the input bitstream into a plurality of compressed pixel data groups of a picture. The second input interface is configured to receive indication information from an out-of-band channel different from the display interface, wherein the indication information is indicative of at least one boundary between consecutive compressed pixel data groups packed in the input bitstream. The controller is configured to refer to the indication information to identify a compressed pixel data group from the compressed pixel data groups. The de-compressor is configured to de-compress the compressed pixel data group to generate a de-compressed pixel data group.

According to a sixth aspect of the present invention, an exemplary data processing apparatus is disclosed. The exemplary data processing apparatus includes an input interface, a controller, and a de-compressor. The input interface is configured to receive an input bitstream from a display interface, and un-pack the input bitstream into a plurality of compressed pixel data groups, wherein at least a portion of at least one of consecutive compressed pixel data groups packed in the input bitstream is generated under a fixed compression ratio. The controller is configured to identify a compressed pixel data group from the compressed pixel data groups according to at least the fixed compression ratio. The de-compressor is configured to de-compress the compressed pixel data group to generate a de-compressed pixel data group.

According to a seventh aspect of the present invention, an exemplary data processing method is disclosed. The exemplary data processing method includes: generating a plurality of compressed pixel data groups by compressing pixel data of a plurality of pixels of a picture based on a pixel data grouping setting of the picture; and packing the compressed pixel data groups into an output bitstream, recording indication information in the output bitstream, and outputting the output bitstream via a display interface, wherein the indication information is indicative of at least one boundary between consecutive compressed pixel data groups packed.

According to an eighth aspect of the present invention, an exemplary data processing method is disclosed. The exemplary data processing method includes: generating a plurality of compressed pixel data groups by compressing pixel data of a plurality of pixels of a picture based on a pixel data grouping setting of the picture; packing the compressed pixel data groups into an output bitstream, and outputting the output bitstream via a display interface; and transmitting indication information via at least one out-of-band channel different from the display interface, wherein the indication information is indicative of at least one boundary between consecutive compressed pixel data groups packed in the output bitstream.

According to a ninth aspect of the present invention, an exemplary data processing method is disclosed. The exemplary data processing method includes: generating a plurality of compressed pixel data groups by compressing pixel data of a plurality of pixels of a picture based on a pixel data grouping setting of the picture; performing bit-rate control; and packing the compressed pixel data groups into an output bitstream, and outputting the output bitstream via a display interface. At least a portion of at least one of consecutive compressed pixel data groups packed in the output bitstream is generated under a fixed compression ratio controlled by the bit-rate control.

According to a tenth aspect of the present invention, an exemplary data processing method is disclosed. The exemplary data processing method includes: receiving an input bitstream from a display interface, un-packing the input bitstream into a plurality of compressed pixel data groups of a picture, and parsing indication information included in the input bitstream, wherein the indication information is indicative of at least one boundary between consecutive compressed pixel data groups packed in the input bitstream; and referring to the indication information to identify a compressed pixel data group from the compressed pixel data groups, and de-compressing the compressed pixel data group to generate a de-compressed pixel data group.

According to an eleventh aspect of the present invention, an exemplary data processing method is disclosed. The exemplary data processing method includes: receiving an input bitstream from a display interface, and un-packing the input bitstream into a plurality of compressed pixel data groups of a picture; receiving indication information from an out-of-band channel different from the display interface, wherein the indication information is indicative of at least one boundary between consecutive compressed pixel data groups packed in the input bitstream; and referring to the indication information to identify a compressed pixel data group from the compressed pixel data groups, and de-compressing the compressed pixel data group to generate a de-compressed pixel data group.

According to a twelfth aspect of the present invention, an exemplary data processing method is disclosed. The exemplary data processing method includes: receiving an input bitstream from a display interface, and un-packing the input bitstream into a plurality of compressed pixel data groups, wherein at least a portion of at least one of consecutive compressed pixel data groups packed in the input bitstream is generated under a fixed compression ratio; and identifying a compressed pixel data group from the compressed pixel data groups according to at least the fixed compression ratio, and de-compressing the compressed pixel data group to generate a de-compressed pixel data group.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a display data and then transmitting a compressed display data over a display interface. As the data size/data rate of the compressed display data is smaller than that of the original un-compressed display data, the power consumption of the display interface is reduced correspondingly. When a display panel with a higher resolution is used for 2D/3D display, a single display driver may require a higher transmission bandwidth for transmitting the display data to the display panel in time. To alleviate the bandwidth and fan-out requirement, multiple display drivers may be used to drive different display regions of the display panel in a parallel manner. If the compressed display data of one picture is transmitted from an application processor to the display drivers via the display interface, each of the display drivers may have difficulty in randomly accessing the compressed display data to obtain a desired compressed data portion. Specifically, in regard to generation of the compressed display data, the rate control is employed to optimally or sub-optimally adjust the bit rate of each compression unit (e.g., 4×2 pixels) so as to achieve the content-aware bit budget allocation and therefore improve the visual quality. For example, variable-length coding (VLC) is commonly employed to achieve the desired bit-rate control. However, when the rate-controlled compression is employed for data size/data rate reduction, the random access capability for the compressed display data suffers. As a result, when compressed data transmission over the display interface is enabled, using multiple display drivers to drive the display panel in a parallel manner cannot be easily realized due to lack of the random access capability for the compressed display data. To solve this issue, the present invention therefore proposes several solutions each capable of making compressed pixel data groups randomly accessible to the display drivers. Further details will be described as below.

Figure 1:
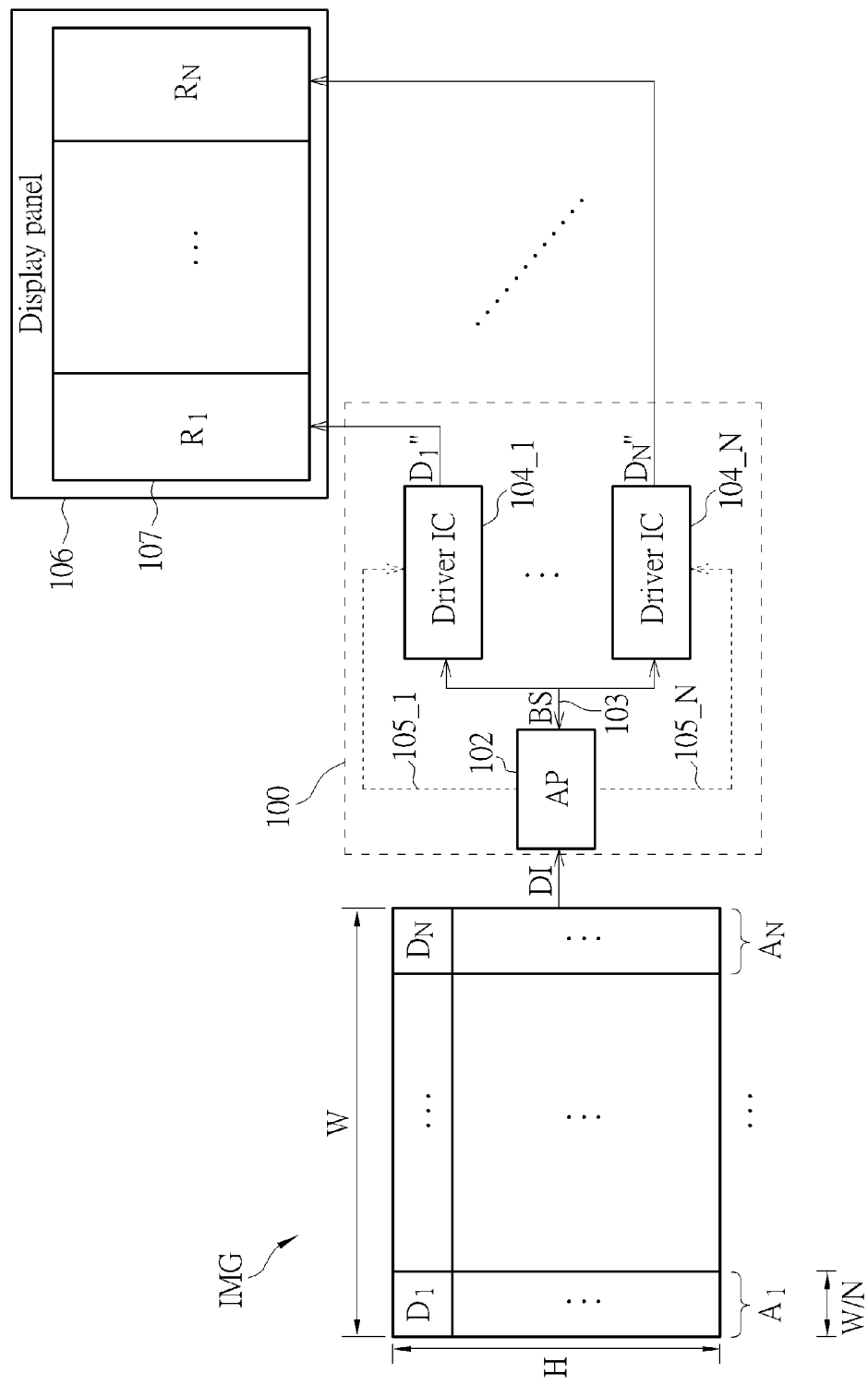
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as one application processor (AP) 102 and a plurality of driver integrated circuits (ICs) 104_1-104_N. In this embodiment, the driver ICs 104_1-104_N serve as multiple display drivers of a display panel 106, where the number of driver ICs 104_1-104_N depends on the actual driving requirement of the display panel 106. For example, the display panel 106 may be a high-definition (HD) panel (e.g., 1080P panel) or an ultra-high definition (UHD) panel (e.g., 4K2K panel). To alleviate the bandwidth requirement between the display driver and the display panel, a display screen 107 of the display panel 106 may be divided into a plurality of display regions $R_1$-$R_N$, and each of the display regions $R_1$-$R_N$ is driven by one of the driver ICs 104_1-104_N. In other words, each of the driver ICs 104_1-104_N is only responsible of driving a portion of the display screen 107, and therefore does not need to transmit all display data of a complete picture to the display panel 106.

The application processor 102 and the driver ICs 104_1-104_N may be implemented in different chips, and the application processor 102 may communicate with the driver ICs 104_1-104_N via a display interface 103. In this embodiment, the display interface 103 may be a display serial interface (DSI) standardized by a Mobile Industry Processor Interface (MIPI) or an embedded display port (eDP) standardized by a Video Electronics Standards Association (VESA). Each of the driver ICs 104_1-104_N receives the same compressed display data of one picture IMG from the application processor 102. For one example, the bitstream BS may be an output bitstream transmitted from a single display port of the application processor 102 to respective driver ICs 104_1-104_N. For another example, the bitstream BS and duplicates thereof may be output bitstreams transmitted from multiple display ports of the application processor 102 to respective driver ICs 104_1-104_N.

The application processor 102 is coupled between an external data source (not shown) and the display interface 103, and supports compressed data transmission. Specifically, the application processor 102 receives the input display data from the external data source (e.g., a camera sensor, a memory card or a wireless receiver), generates a compressed display data by compressing the input display data, and transmits the same compressed display data to each of the driver ICs 104_1-104_N via the display interface 103, where the input display data may be image data or video data that includes pixel data DI of a plurality of pixels of one picture IMG to be displayed on the display panel 106. Please refer to FIG. 2, which is a diagram of the application processor 102 shown in FIG. 1 according to an embodiment of the present invention. The application processor 102 includes a display controller 111, an output interface 112 and a processing circuit 113. The processing circuit 113 includes circuit elements required for processing the pixel data DI of the picture IMG. For example, the processing circuit 113 has a compressor 114, a rate controller 115 and other circuitry 116. The other circuitry 116 may have a display processor, additional image processing element(s), etc. The display processor may perform image processing operations, including scaling, rotating, etc. For example, the input display data provided by the external data source may be bypassed or processed by the additional image processing element(s) located before the display processor to generate a source display data, and then the display processor may process the source display data to generate the pixel data DI of the picture IMG to the application processor 102. In other words, the pixel data DI to be processed by the application processor 102 may be directly provided from the external data source or indirectly obtained from the input display data provided by the external data source. The present invention has no limitation on the source of the pixel data DI.

The compressor 114 is configured to generate a plurality of compressed pixel data groups by compressing the pixel data DI of the picture IMG based on a pixel data grouping setting $DG_{SET}$ of the picture IMG. By way of example, the pixel data grouping setting $DG_{SET}$ is determined based on the number of driver ICs enabled to drive display regions of a display screen. Specifically, the display controller 111 controls the operation of the application processor 102. Hence, the display controller 111 may first check the number of enabled driver ICs coupled to the application processor 102, and then determine the pixel data grouping setting $DG_{SET}$ in response to a checking result. For example, when receiving a query issued from the display controller 111 of the application processor 102, each of the driver ICs 104_1-

104_N implemented in the data processing system 100 generates an acknowledgement message to the display controller 111. Thus, the display controller 111 refers to the acknowledgement messages of the driver ICs 104_1-104_N to know that there are N enabled driver ICs 104_1-104_N coupled to the application processor 102, and also knows that there are N display regions $R_1$-$R_N$ driven by the enabled driver ICs 104_1-104_N. Since the display regions $R_1$-$R_N$ will be used to display image contents of a plurality of image partitions in the same picture respectively, the pixel data grouping setting $DG_{SET}$ corresponding to the exemplary arrangement of the image partitions $A_1$-$A_N$ shown in FIG. 1 may be decided by the display controller 111. That is, pixel data of pixels belonging to the image partition $A_1$ will be used for generating a display data to the display region $R_1$, and pixel data of pixels belonging to the image partition $A_N$ will be used for generating a display data to the display region $R_N$. Hence, based on the pixel data grouping setting $DG_{SET}$, the compressor 114 knows the pixel boundary between pixel groups corresponding to different image partitions, and compresses pixel data of pixels in each pixel group (i.e., one pixel data group) into a compressed pixel data group.

As shown in FIG. 1, the width of the picture IMG is W, and the height of the picture IMG is H. Supposing that the display regions $R_1$-$R_N$ have the same size, each of the image partitions $A_1$-$A_N$ has the same resolution of (W/N)×H. It should be noted that this is for illustrative purposes only. In an alternative design, the display regions $R_1$-$R_N$ may have different sizes, and the image partitions $A_1$-$A_N$ may have different resolutions. Moreover, the horizontal display region partitioning applied to the display screen 107 and the horizontal image partitioning applied to the picture IMG are not meant to be limitations of the present invention. In an alternative design, the vertical display region partitioning may be applied to the display screen 107, thus resulting in multiple display regions arranged vertically in the display screen 107; and the vertical image partitioning may be applied to the picture IMG, thus resulting in multiple image partitions arranged vertically in the picture IMG.

Concerning compression units (e.g., compression units each having 4×2 pixels) located at the same row, the pixel data of all pixels included in compression units corresponding to each image partition is compressed to generate a corresponding compressed pixel data group. For example, the pixel data of all pixels included in compression units corresponding to the image partition $A_1$ (i.e., the pixel data group $D_1$) is compressed to generate a corresponding compressed pixel data group $D_1'$, and the pixel data of all pixels included in compression units corresponding to the image partition $A_N$ (i.e., the pixel data group $D_N$) is compressed to generate a corresponding compressed pixel data group $D_N'$. In other words, the compressor 114 generates compressed pixel data groups $D_1'$-$D_N'$ by compressing pixel data groups $D_1$-$D_N$, respectively.

The rate controller 115 is configured to apply bit-rate control to the compressor 114 for controlling a bit budget allocation per compression unit. In this way, each of the compressed pixel data groups (e.g., $D_1'$-$D_N'$) is generated at a desired bit rate. The output interface 112 is configured to pack/packetize compressed pixel data groups (e.g., $D_1'$-$D_N'$) into at least one output bitstream according to the transmission protocol of the display interface 103, and transmit the at least one output bitstream to each of the driver ICs 104_1-104_N via the display interface 103. By way of example, one bitstream BS may be generated from the application processor 102 to each of the driver ICs 104_1-104_N via at least one display port of the display interface 103. The application processor 102 employs one of the proposed random access enhancement designs to make the compressed pixel data groups $D_1'$-$D_N'$ transmitted via the display interface 103 become randomly accessible to each of the driver ICs 104_1-104_N. Further details of the proposed random access enhancement designs will be described later.

Please refer to FIG. 1 again. When the application processor 102 transmits compressed display data to the driver ICs 104_1-104_N, each of the driver ICs 104_1-104_N is configured to receive the same compressed display data from the display interface 103, and only de-compress a portion of the randomly accessible compressed display data (which is randomly accessible to each driver IC due to using the proposed random access enhancement technique) to generate a de-compressed display data for driving a portion of the display screen 107. For example, concerning compression units at the same row in the picture IMG, the application processor 102 generates compressed pixel data groups $D_1'$-$D_N'$ according to pixel data groups $D_1$-$D_N$ belonging to different image partitions $A_1$-$A_N$. When receiving the compressed pixel data groups $D_1'$-$D_N'$ packed in an input bitstream (i.e., the bitstream BS generated from the application processor 102), the driver IC 104_1 only drives the display region $R_1$ of the display screen 107 to display a de-compressed pixel data group $D_1''$ derived from de-compressing the compressed pixel data group $D_1'$ selected from the compressed pixel data groups $D_1'$-$D_N'$. Similarly, when receiving the compressed pixel data groups $D_1'$-$D_N'$ packed in an input bitstream (e.g., the bitstream BS generated from the application processor 102), the driver IC 104_N only drives the display region $R_N$ of the display screen 107 to display a de-compressed pixel data group $D_N''$ derived from de-compressing the compressed pixel data group $D_N'$ selected from the compressed pixel data groups $D_1'$-$D_N'$.

Figure 3:
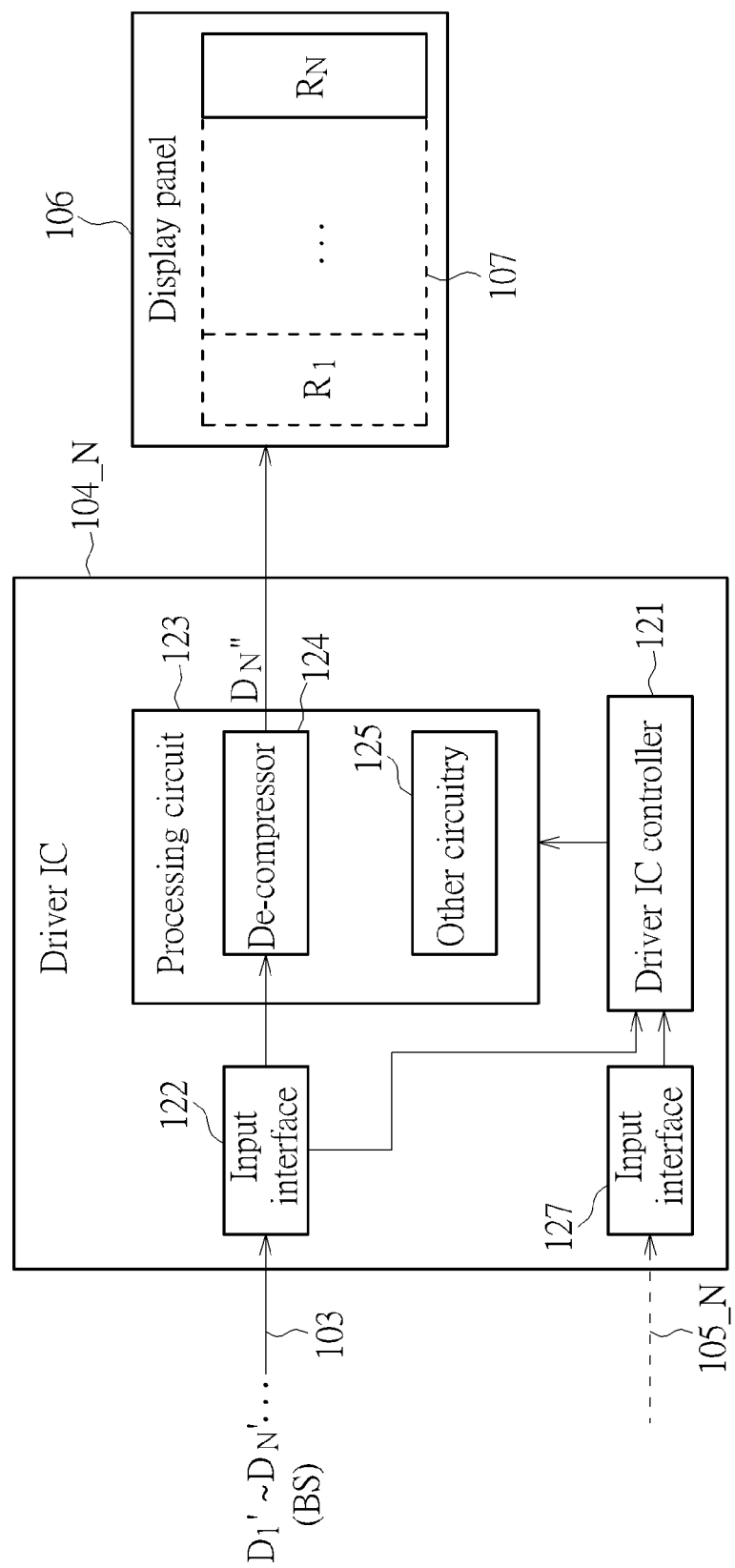
FIG. 3 is a diagram of a driver IC shown in FIG. 1 according to an embodiment of the present invention.

Each of the driver ICs 104_1-104_N communicates with the application processor 102 via the display interface 103, and may have the same circuit configuration. For clarity and simplicity, only one of the driver ICs 104_1-104_N is detailed as below. Please refer to FIG. 3, which is a diagram illustrating the driver IC 104_N shown in FIG. 1 according to an embodiment of the present invention. The driver IC 104_N is coupled between the display interface 103 and the display panel 106, and supports compressed data reception. In this embodiment, the driver IC 104_N includes a driver IC controller 121, an input interface 122 and a processing circuit 123. The input interface 122 is configured to receive an input bitstream from the display interface 103 (e.g., the bitstream BS generated from the application processor 102), and un-pack/un-packetize the input bitstream into a plurality of compressed pixel data groups of one picture (e.g., compressed pixel data groups $D_1'$-$D_N'$ packed in the bitstream BS). It should be noted that, if there is no error introduced during the data transmission, the compressed pixel data groups un-packed/un-packetized from the input interface 122 should be identical to the compressed pixel data groups $D_1'$-$D_N'$ received by the output interface 112.

The driver IC controller 121 is configured to control the operation of the processing circuit 123. The processing circuit 123 may include circuit elements required for driving one target display region (e.g., $R_N$) in the display panel 106. For example, the processing circuit 123 has a de-compressor 124 and other circuitry 125. The other circuitry 125 may have a display buffer, additional image processing element(s), etc. In this embodiment, the driver IC controller 121 is capable of detecting/deciding the boundary between any consecutive compressed pixel data groups un-packed from the input interface 122. Hence, concerning the compressed pixel data group $D_1'$-$D_N'$ un-packed from the input interface 122, the driver IC controller 121 instructs the de-compressor 124 to de-compress one selected compressed pixel data group (e.g., $D_N'$) only and discard un-selected compressed pixel data groups (e.g., $D_1'$-$D_{N-1}'$).

As mentioned above, each of the driver ICs 104_1-104_N is only responsible of driving a portion of the display screen 107. Hence, with the help of the proposed random access capability enhancement technique, each of the driver ICs 104_1-104_N can identify and process a desired data portion in the received compressed display data of the picture IMG in a random access manner, and discard the remaining data portion in the received compressed display data of the picture IMG. Several random access capability enhancement techniques proposed by the present invention are described as below.

In one exemplary data processing system design with enhanced random access capability, the output interface 112 further records indication information in the output bitstream, wherein the indication information is indicative of at least one boundary between consecutive compressed pixel data groups packed in the output bitstream. In addition, the input interface 122 further parses indication information included in the input bitstream, wherein the indication information is indicative of at least one boundary between consecutive compressed pixel data groups packed in the input bitstream. In other words, the indication information is transmitted through an in-band channel (i.e., display interface 103).

Figure 4:
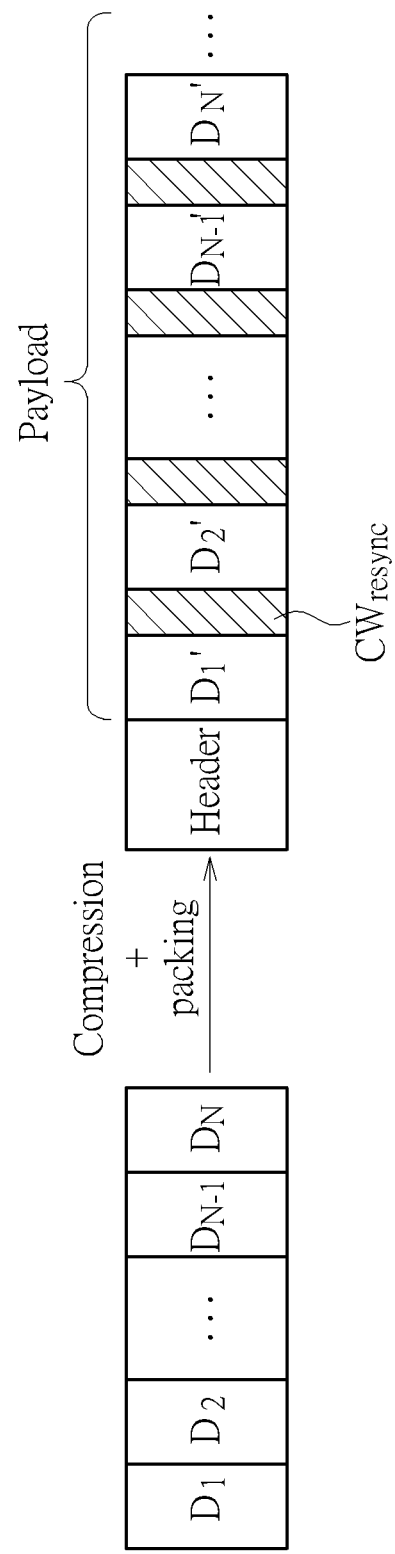
FIG. 4 is a diagram illustrating a first random access capability enhancement technique proposed by the present invention.

For example, the indication information may be recorded in a payload portion of the bitstream BS transmitted from the application processor 102 to each of the driver ICs 104_1-104_N. Please refer to FIG. 4, which is a diagram illustrating a first random access capability enhancement technique proposed by the present invention. The display controller 111 shown in FIG. 2 generates a control signal C1 to the compressor 114 to enable insertion of one re-synchronization marker $CW_{resync}$ between two compressed pixel data groups corresponding to different image partitions in the same picture IMG. As shown in FIG. 4, one re-synchronization marker $CW_{resync}$ is inserted between the compressed pixel data groups $D_1'$ and $D_2'$, and one re-synchronization marker $CW_{resync}$ is inserted between the compressed pixel data groups $D_{N-1}'$ and $D_N'$. The re-synchronization markers $CW_{resync}$ serves as the aforementioned indication information recorded in the payload portion of the bitstream BS, and indicates the start of an independently decodable compressed pixel data group in the bitstream BS. It should be noted that the re-synchronization markers $CW_{resync}$ may be implemented using a unique codeword different from all possible payload codewords and all possible header syntax patterns that may be transmitted over the display interface 103. Hence, when the bitstream BS with re-synchronization markers $CW_{resync}$ properly inserted in the payload portion is received by a driver IC (e.g., driver IC 104_N), the input interface 122 is further configured to detect re-synchronization markers $CW_{resync}$ and inform the driver IC controller 121 of locations of the detected re-synchronization markers $CW_{resync}$. Based on the locations of the detected re-synchronization markers $CW_{resync}$, the driver IC controller 121 knows the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$. With the help of the re-synchronization markers, the compressed pixel data groups can be randomly accessed by the driver ICs 104_1-104_N.

Figure 5:
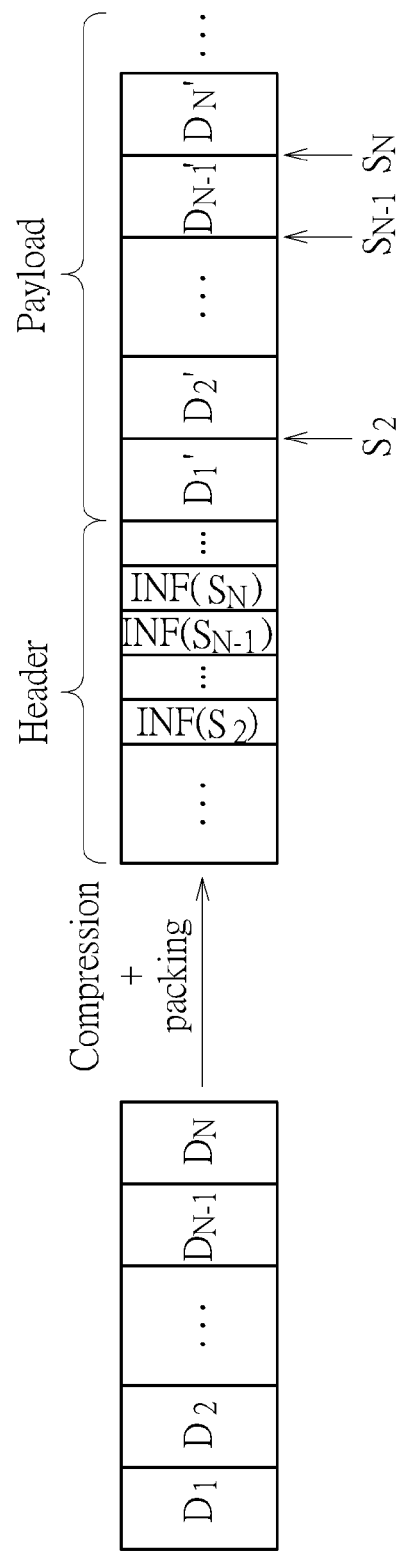
FIG. 5 is a diagram illustrating a second random access capability enhancement technique proposed by the present invention.

For another example, the indication information may be recorded in a header portion of the bitstream BS transmitted from the application processor 102 to each of the driver ICs 104_1-104_N. Please refer to FIG. 5, which is a diagram illustrating a second random access capability enhancement technique proposed by the present invention. The display controller 111 shown in FIG. 2 generates a control signal C2 to the output interface 112 to enable transmission of boundary position information of two compressed pixel data groups corresponding to different image partitions in the same picture IMG. As shown in FIG. 5, the boundary position information $INF(S_2)$ records a position $S_2$ of a boundary between consecutive compressed pixel data groups $D_1'$ and $D_2'$ packed in the bitstream BS, and the boundary position information $INF(S_N)$ records a position $S_N$ of a boundary between consecutive compressed pixel data groups $D_{N-1}'$ and $D_N'$ packed in the bitstream BS. The boundary position information $INF(S_2)$-$INF(S_N)$ serves as the aforementioned indication information recorded in the header portion of the bitstream BS, and directly indicates the start of an independently decodable compressed pixel data group in the bitstream BS. Hence, when the bitstream BS with the boundary position information $INF(S_2)$-$INF(S_N)$ properly included in the header portion is received by a driver IC (e.g., driver IC 104_N), the input interface 122 is further configured to inform the driver IC controller 121 of the boundary position information $INF(S_2)$-$INF(S_N)$ parsed from the bitstream BS. Based on the boundary locations, the driver IC controller 121 knows the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$. With the help of the boundary position information, the compressed pixel data groups can be randomly accessed by the driver ICs 104_1-104_N.

Figure 6:
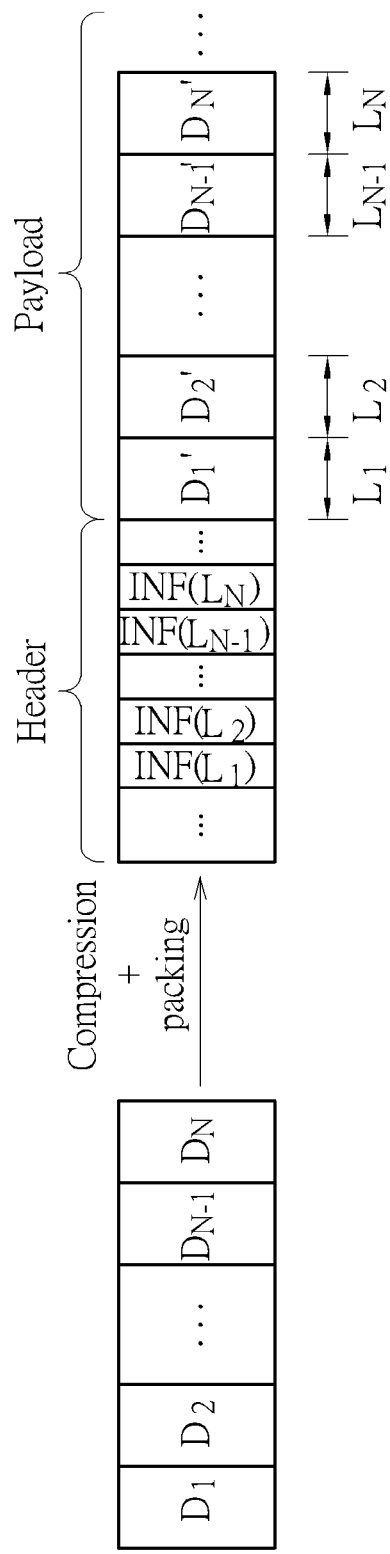
FIG. 6 is a diagram illustrating a third random access capability enhancement technique proposed by the present invention.

Using the boundary position information INF $(S_2)$-INF $(S_N)$ to serve as the indication information recorded in the header portion of the bitstream BS transmitted via the display interface 103 is merely one feasible implementation. Alternatively, the indication information recorded in the header portion of the bitstream BS transmitted via the display interface 103 may be set by length information of compressed pixel data groups. Please refer to FIG. 6, which is a diagram illustrating a third random access capability enhancement technique proposed by the present invention. The display controller 111 shown in FIG. 2 generates the control signal C2 to the output interface 112 to enable transmission of length information of compressed pixel data groups corresponding to different image partitions in the same picture IMG. As shown in FIG. 6, the length information INF $(L_1)$ records a length $L_1$ of the compressed pixel data group $D_1'$ packed in the bitstream BS, the length information $INF(L_2)$ records a length $L_2$ of the compressed pixel data group $D_2'$ packed in the bitstream BS, the length information INF $(L_{N-1})$ records a length $L_{N-1}$ of the compressed pixel data group $D_{N-1}'$ packed in the bitstream BS, and the length information INF ($L_N$) records a length $L_N$ of the compressed pixel data group $D_N'$ packed in the bitstream BS. The length information INF ($L_1$)-INF ($L_N$) serves as the aforementioned indication information recorded in the header portion of the bitstream BS, and can be used to calculate the start of an independently decodable compressed pixel data group in the bitstream BS. That is, the boundary positions can be indirectly known based on the lengths of the compressed pixel data groups. Hence, when the bitstream BS with the length information INF ($L_1$)-INF ($L_N$) properly included in the header portion is received by a driver IC (e.g., driver IC 104_N), the input interface 122 is further configured to inform the driver IC controller 121 of the length information INF ($L_1$)-INF ($L_N$) parsed from the bitstream BS. Based on lengths of compressed pixel data groups, the driver IC controller 121 knows the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$. With the help of the length position information, the compressed pixel data groups can be randomly accessed by the driver ICs 104_1-104_N.

Figure 7:
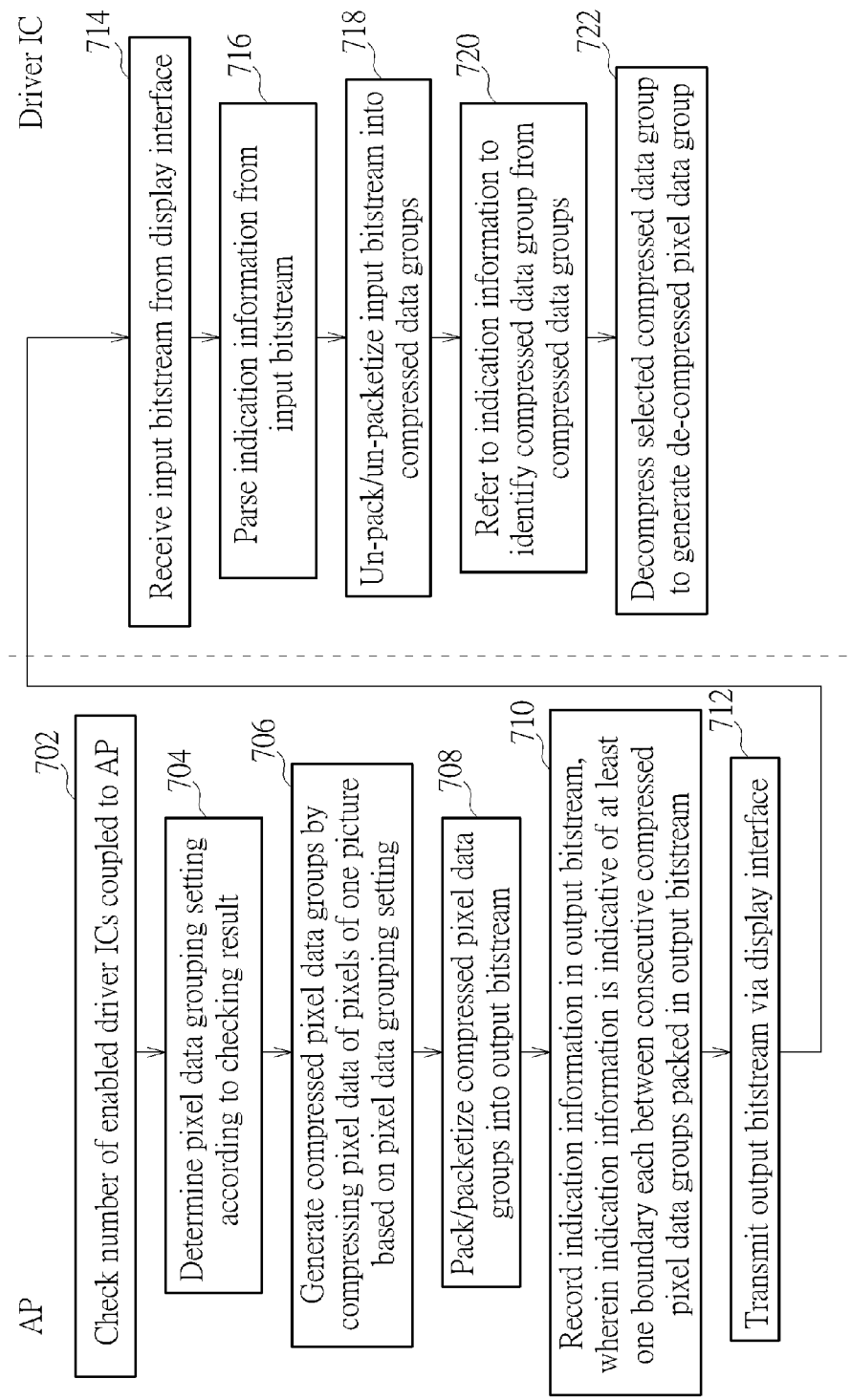
FIG. 7 is a flowchart illustrating one control and data flow of the data processing system shown in FIG. 1 according to an embodiment of the present invention.

FIG. 7 is a flowchart illustrating one control and data flow of the data processing system 100 shown in FIG. 1 according to an embodiment of the present invention. Provided that the result is substantially the same, the steps are not required to be executed in the exact order shown in FIG. 7. The exemplary control and data flow may be briefly summarized by following steps.

Step 702: Check the number of enabled driver ICs coupled to an application processor.

Step 704: Determine a pixel data grouping setting according to a checking result. For example, when the checking result indicates that N driver ICs are enabled to drive different display regions of the same display screen, the pixel data grouping setting may be determined based on the exemplary arrangement of image partitions $A_1$-$A_N$ in the picture IMG, as shown in FIG. 1.

Step 706: Generate a plurality of compressed pixel data groups by compressing pixel data of a plurality of pixels of a picture based on the pixel data grouping setting of the picture.

Step 708: Pack/packetize the compressed pixel data groups into an output bitstream.

Step 710: Record indication information in the output bitstream, wherein the indication information is indicative of at least one boundary between consecutive compressed pixel data groups packed in the output bitstream. In one exemplary design, the indication information is recorded in a payload portion of the output bitstream. For example, the indication information includes one re-synchronization marker inserted between two consecutive compressed pixel data groups. In another exemplary design, the indication information is recorded in a header portion of the output bitstream. For example, the indication information may be boundary position information which records a position of each boundary between consecutive compressed pixel data groups packed in the output bitstream. For another example, the indication information may be length information which records a length of each compressed pixel data group packed in the output bitstream.

Step 712: Transmit the output bitstream via a display interface.

Step 714: Receive an input bitstream from the display interface.

Step 716: Parse the indication information from the input bitstream.

Step 718: Un-pack/un-packetize the input bitstream into a plurality of compressed data groups.

Step 720: Refer to the indication information to identify a compressed data group from the compressed data groups.

Step 722: Decompress the selected compressed data group to generate a de-compressed pixel data group.

It should be noted that steps 702-712 are performed by the application processor (AP) 102, and steps 714-722 are performed by one of the driver ICs 104_1-104_N. As a person skilled in the art can readily understand details of each step shown in FIG. 7 after reading above paragraphs, further description is omitted here for brevity.

In another exemplary data processing system design with enhanced random access capability, the application processor 102 has another output interface (e.g., an output interface 117 in FIG. 2) configured to transmit indication information to each of the driver ICs 104_1-104_N via out-of-band channels 105_1-105_N, wherein the indication information is indicative of at least one boundary between consecutive compressed pixel data groups packed in the output bitstream transmitted via an in-band channel (i.e., display interface 103). In addition, each driver IC (e.g., the driver IC 104_N in FIG. 3) has another input interface (e.g., an input interface 122 in FIG. 3) configured to receive indication information from a corresponding out-of-band channel (e.g., the out-of-band channel 105_N in FIG. 3), wherein the indication information is indicative of at least one boundary between consecutive compressed pixel data groups packed in the input bitstream received from an in-band channel (i.e., display interface 103). By way of example, but not limitation, each of the out-of-band channels 105_1-105_N may be an I²C (Inter-Integrated Circuit) bus, the application processor 102 may be an I²C master device, and the driver ICs 104_1-104_N may be I²C slave devices.

Figure 8:
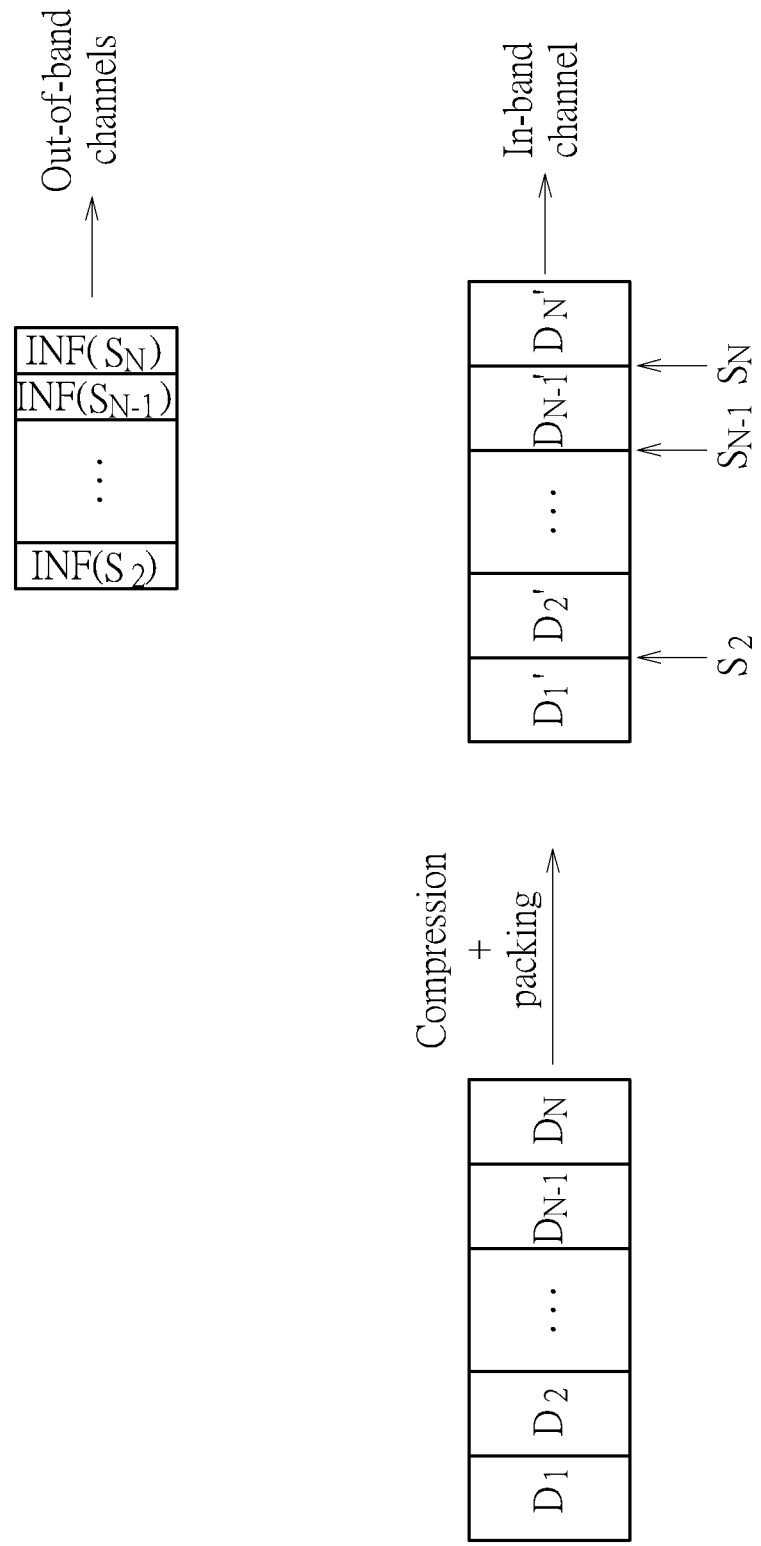
FIG. 8 is a diagram illustrating a fourth random access capability enhancement technique proposed by the present invention.

Please refer to FIG. 8, which is a diagram illustrating a fourth random access capability enhancement technique proposed by the present invention. The aforementioned boundary position information INF($S_2$)-INF($S_N$) is transmitted via each of the out-of-band channels 105_1-105_N. Hence, when boundary position information INF ($S_2$)-INF ($S_N$) is received by a driver IC (e.g., driver IC 104_N), the input interface 122 forwards the received boundary position information INF ($S_2$)-INF ($S_N$) to the driver IC controller 121. Based on the boundary positions, the driver IC controller 121 knows the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$.

Figure 9:
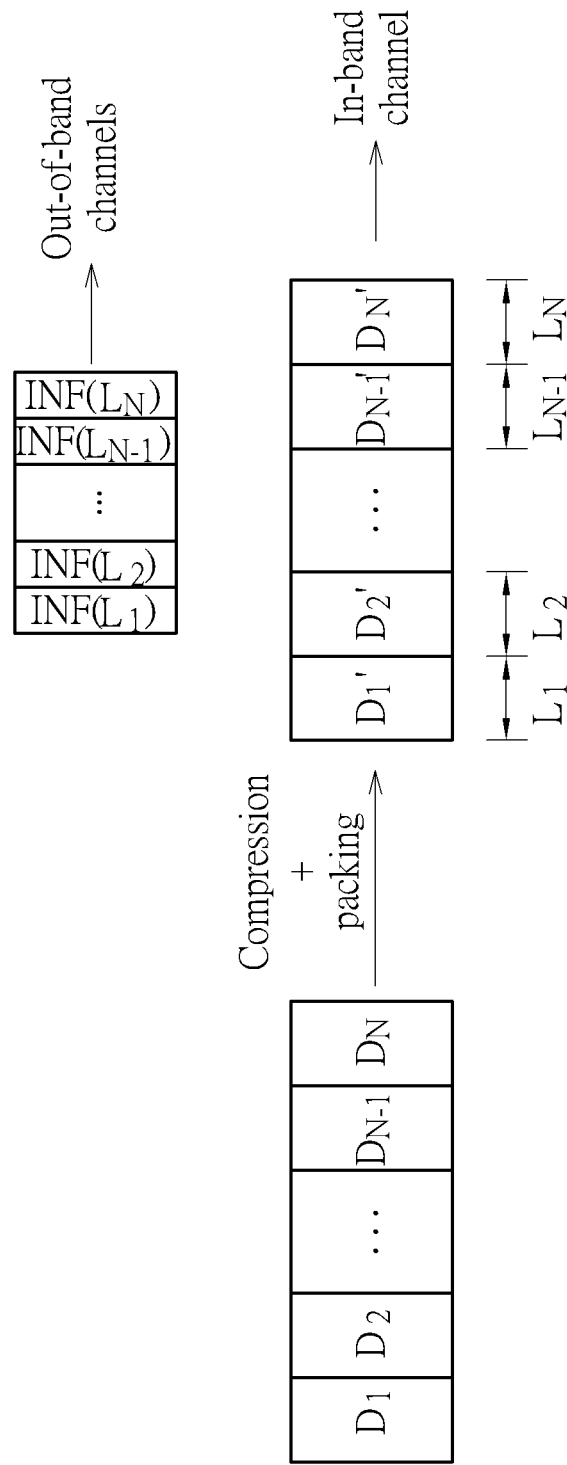
FIG. 9 is a diagram illustrating a fifth random access capability enhancement technique proposed by the present invention.

Please refer to FIG. 9, which is a diagram illustrating a fifth random access capability enhancement technique proposed by the present invention. The aforementioned length information INF($L_1$)-INF($L_N$) is transmitted via each of the out-of-band channels 105_1-105_N. Hence, when length information INF($L_1$)-INF($L_N$) is received by a driver IC (e.g., driver IC 104_N), the input interface 122 forwards the received length information INF($L_1$)-INF($L_N$) to the driver IC controller 121. Based on lengths of compressed pixel data groups, the driver IC controller 121 knows the arrangement of compressed data partitions in the payload portion of the bitstream BS. Hence, when the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$.

Figure 10:
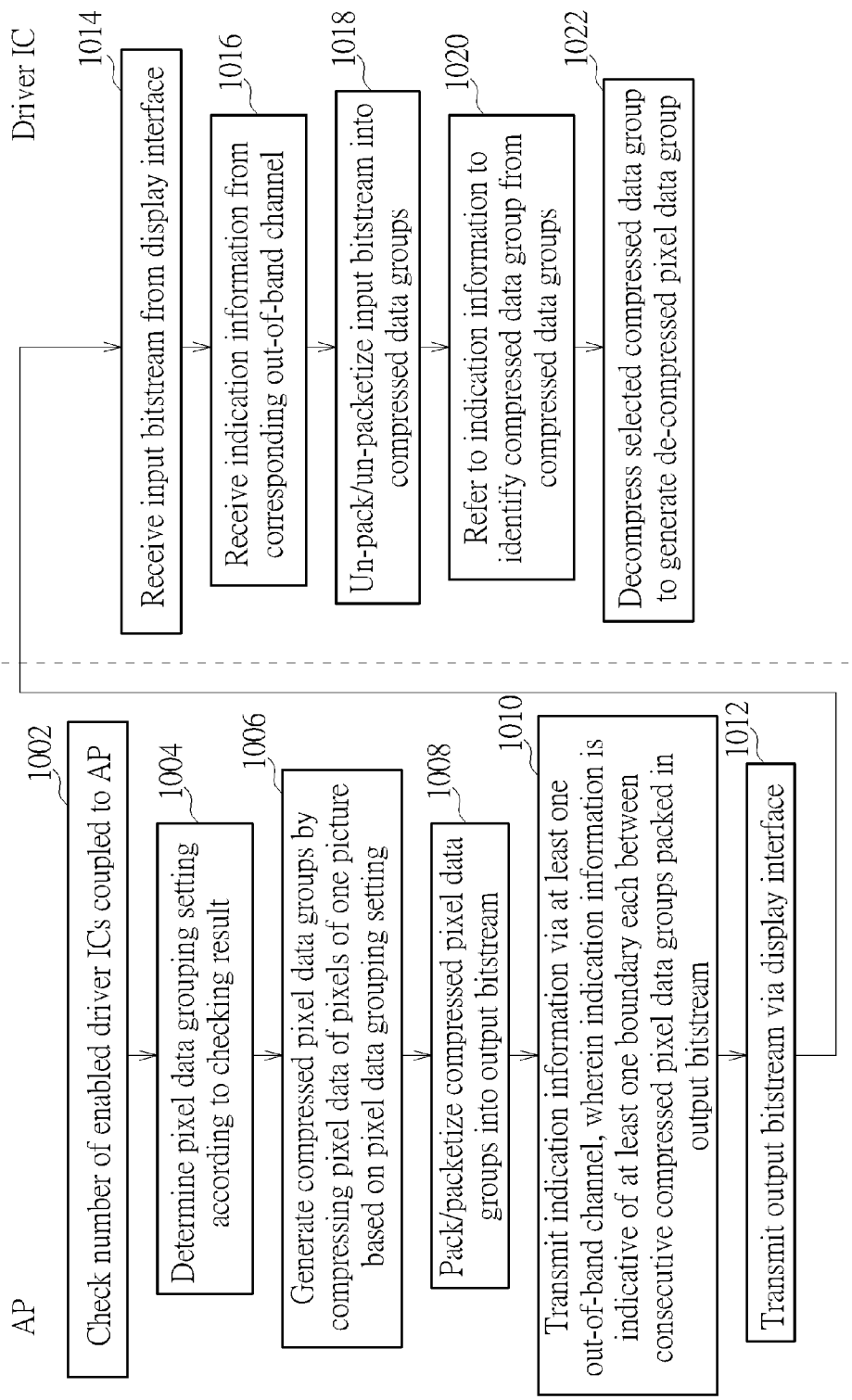
FIG. 10 is a flowchart illustrating another control and data flow of the data processing system shown in FIG. 1 according to an embodiment of the present invention.

FIG. 10 is a flowchart illustrating another control and data flow of the data processing system 100 shown in FIG. 1 according to an embodiment of the present invention. Provided that the result is substantially the same, the steps are not required to be executed in the exact order shown in FIG. 10. The exemplary control and data flow may be briefly summarized by following steps.

Step 1002: Check the number of enabled driver ICs coupled to an application processor.

Step 1004: Determine a pixel data grouping setting according to a checking result. For example, when the checking result indicates that N driver ICs are enabled to drive different display regions of the same display screen, the pixel data grouping setting may be determined based on the exemplary arrangement of image partitions $A_1$-$A_N$ in the picture IMG, as shown in FIG. 1.

Step 1006: Generate a plurality of compressed pixel data groups by compressing pixel data of a plurality of pixels of a picture based on the pixel data grouping setting of the picture.

Step 1008: Pack/packetize the compressed pixel data groups into an output bitstream.

Step 1010: Transmit indication information via at least one out-of-band channel, wherein the indication information is indicative of at least one boundary between consecutive compressed pixel data groups packed in the output bitstream. For example, the indication information may be boundary position information which records a position of each boundary between consecutive compressed pixel data groups packed in the output bitstream. For another example, the indication information may be length information which records a length of each compressed pixel data group packed in the output bitstream.

Step 1012: Transmit the output bitstream via a display interface.

Step 1014: Receive an input bitstream from the display interface.

Step 1016: Receive the indication information from a corresponding out-of-band channel.

Step 1018: Un-pack/un-packetize the input bitstream into a plurality of compressed data groups.

Step 1020: Refer to the indication information to identify a compressed data group from the compressed data groups.

Step 1022: Decompress the selected compressed data group to generate a de-compressed pixel data group.

It should be noted that steps 1002-1012 are performed by the application processor (AP) 102, and steps 1014-1022 are performed by one of the driver ICs 104_1-104_N. As a person skilled in the art can readily understand details of each step shown in FIG. 10 after reading above paragraphs, further description is omitted here for brevity.

In yet another exemplary data processing system design with enhanced random access capability, the rate controller 115 is configured to ensure that at least a portion (i.e., part or all) of at least one of consecutive compressed pixel data groups packed in the output bitstream is generated under a fixed compression ratio CR, where $$CR = \frac{\text{Uncompressed data size}}{\text{Compressed data size}}.$$

In this embodiment, the application processor 102 may inform the driver ICs 104_1-104_N of the setting of fixed compression ratio CR through any feasible handshaking mechanism. Though a variable-length coding operation is applied to at least a portion (i.e., part or all) of a pixel data group, a rate-controlled compression result of at least a portion (i.e., part or all) of the pixel data group is ensured to have a known size due to the fixed compression ratio CR. In this way, the end of a corresponding compressed pixel data group derived from compressing the pixel data group can be determined based on at least the fixed compression ratio CR.

Figure 2:
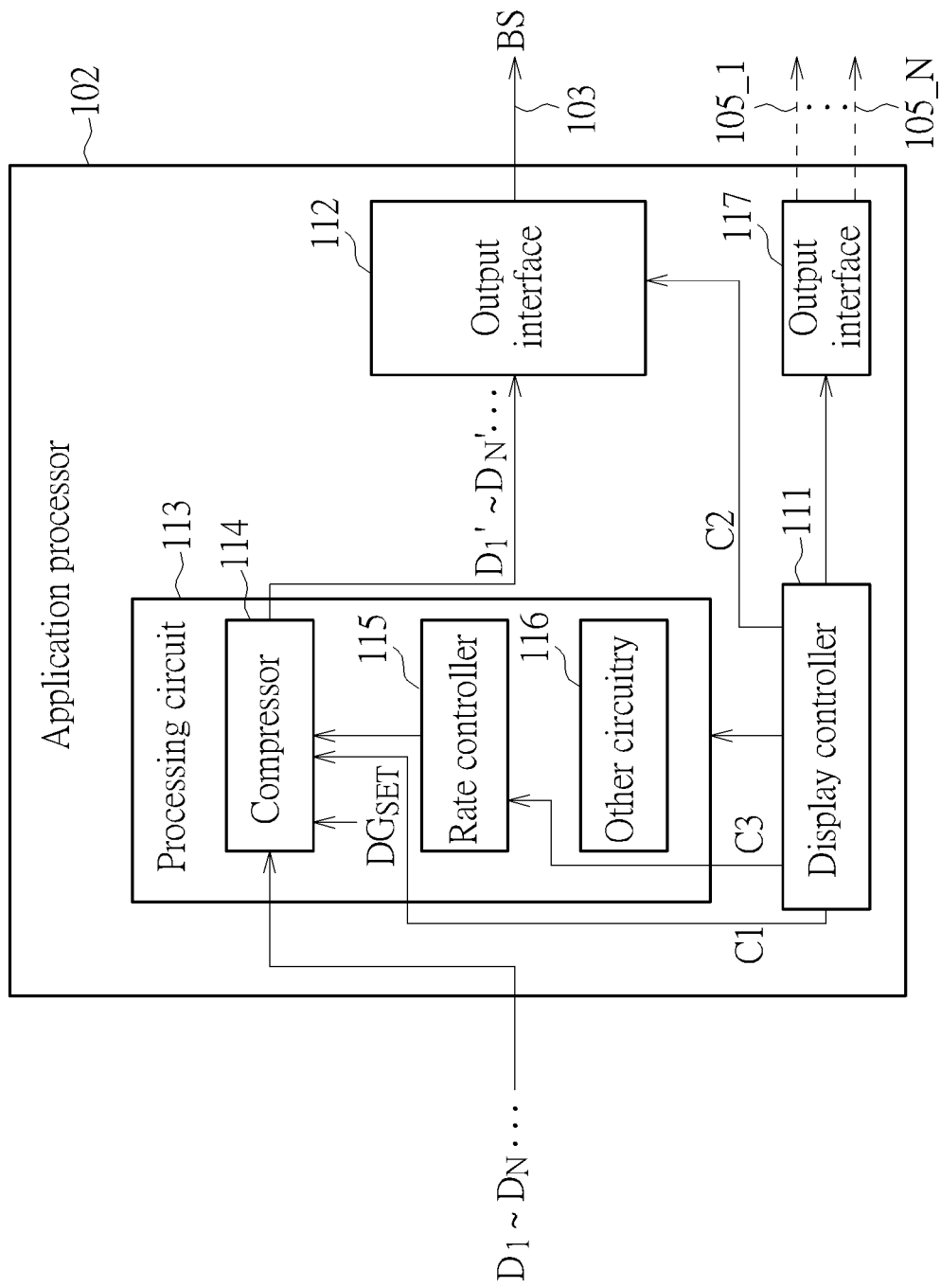
FIG. 2 is a diagram of an application processor shown in FIG. 1 according to an embodiment of the present invention.
Figure 11:
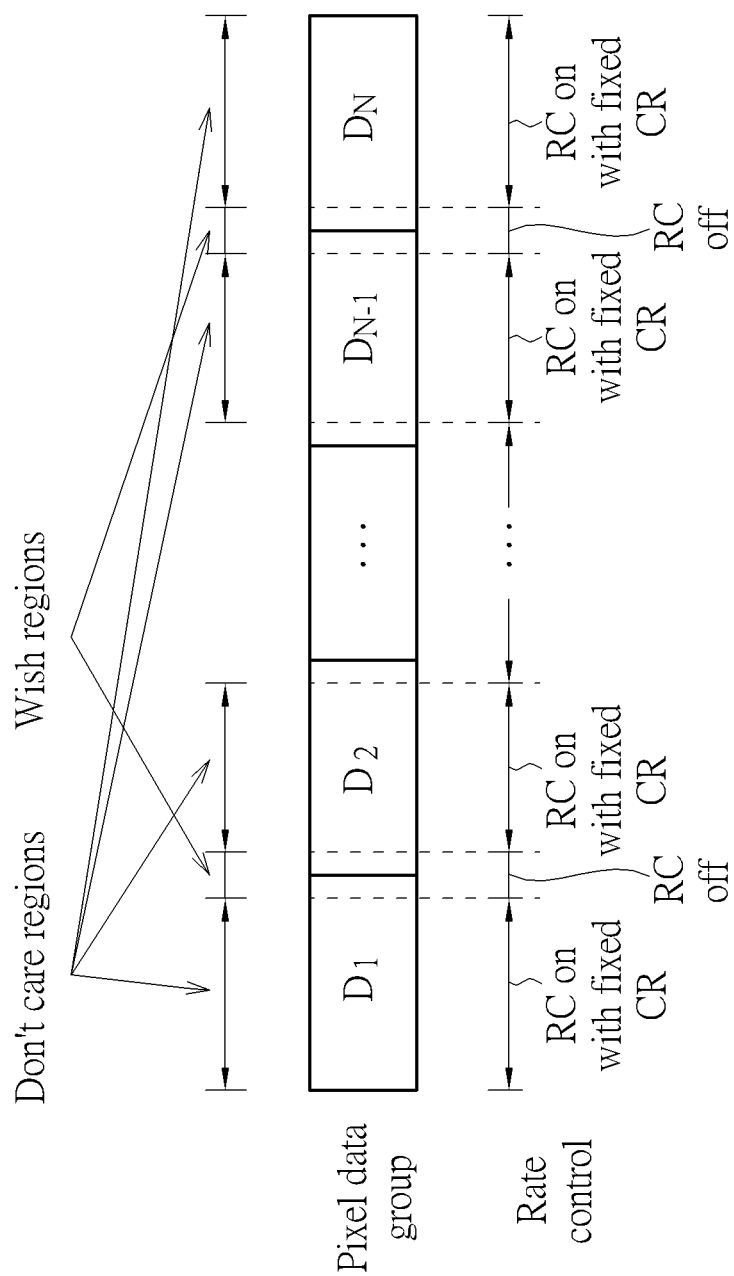
FIG. 11 is a diagram illustrating a sixth random access capability enhancement technique proposed by the present invention.

For example, the display controller 111 shown in FIG. 2 may generate a control signal C3 to instruct the rate controller 115 to partially enable bit-rate control for compression of each pixel data group. Please refer to FIG. 11, which is a diagram illustrating a sixth random access capability enhancement technique proposed by the present invention. From the perspective of random access requirements, each pixel data group composed of pixel data of pixels belonging to one image partition in the picture IMG may be regarded as having a don't care region and a wish region, where a compression result of the don't care region does not need random access at the driver IC side, and a compression result of the wish region needs random access at the driver IC side. As can be seen from FIG. 11, the boundary between the pixel data groups $D_1$ and $D_2$ is also the boundary between wish regions of the pixel data groups $D_1$ and $D_2$, and the boundary between the pixel data groups $D_{N-1}$ and $D_N$ is also the boundary between wish regions of the pixel data groups $D_{N-1}$ and $D_N$.

While the compressor 114 is compressing a don't care region of a pixel data group, the rate controller 115 enables bit-rate control RC with a fixed compression ratio CR. Hence, each of compression units in the don't care region may undergo variable-length coding, such that compression results of the compression units may have different lengths. Since compression results generated from compressing compression units in the don't care region have variable lengths, it is difficult to randomly access the compression results. However, an overall compressed data size of the don't care region would have a fixed value due to the fixed compression ratio CR well controlled by the rate controller 115. Hence, based on the fixed compression ratio CR, a boundary between a compression result of the don't care region and a compression result of the wish region can be easily known. While the compressor 114 is compressing a wish region of a pixel data group, the rate controller 115 disables bit-rate control RC. Hence, each of compression units in the wish region may undergo fixed-length coding, such that compression results of the compression units may have the same length. Since compression results generated from compressing compression units in the wish region have fixed lengths, it is easy to randomly access the compression results. Hence, the boundary between the consecutive compressed pixel data groups can be determined. That is, the start of an independently decodable compressed pixel data group in the bitstream BS can be identified.

When the bitstream BS with compressed pixel data groups each generated by partially enabled rate control is received by a driver IC (e.g., driver IC 104_N), the driver IC controller 121 may refer to the fixed compression ratio CR and the fixed size of each data group (which may also be informed by the application processor 104 through a handshaking mechanism) to know the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to de-compress the desired compressed pixel data group $D_N'$. With the help of the rate controller 115 that performs partially enabled rate control upon compression of each pixel data group to make a compression result of a portion of the pixel data group have a fixed compression ratio, the compressed pixel data groups can be randomly accessed by the driver ICs 104_1-104_N.

Figure 12:
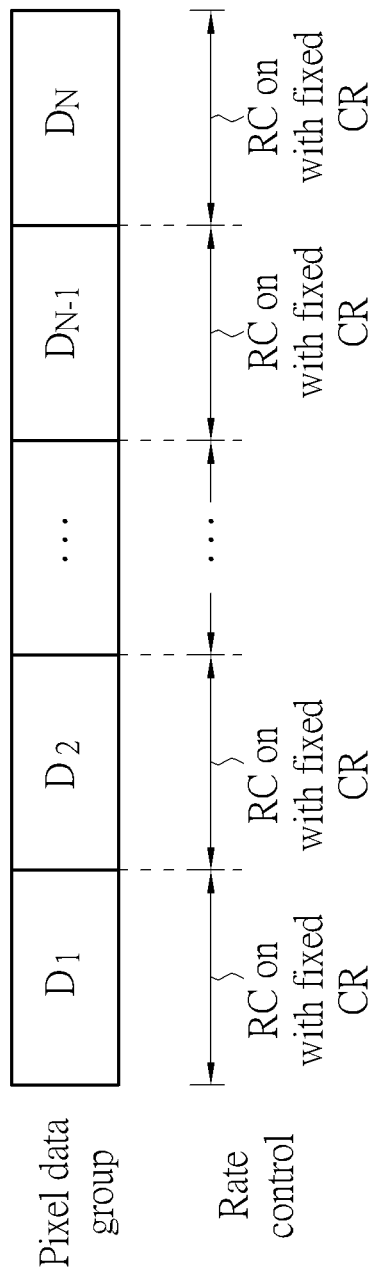
FIG. 12 is a diagram illustrating a seventh random access capability enhancement technique proposed by the present invention.

As mentioned above, compression results generated from compressing compression units in the wish region can be randomly accessed. When performing de-compression upon a compressed pixel data group, the de-compressor of one driver IC may retrieve and de-compress more compressed pixel data from wish region(s) of adjacent compressed pixel data group(s) for improving the image quality on the boundary of de-compressed pixel data groups. However, this is for illustrative purposes only, and is not meant to be a limitation of the present invention. In an alternative design, the random access capability is available only for complete compressed pixel data groups. For example, the display controller 111 generates the control signal C3 to instruct the rate controller 115 to enable bit-rate control for compression of each complete pixel data group. Please refer to FIG. 12, which is a diagram illustrating a seventh random access capability enhancement technique proposed by the present invention. From the perspective of random access requirements, each pixel data group composed of pixel data of pixels belonging to one image partition in the picture IMG may be regarded as having a don't care region only. As mentioned above, a compression result of the don't care region does not need random access at the driver IC side.

While the compressor 114 is compressing each pixel data group, the rate controller 115 enables bit-rate control RC with a fixed compression ratio CR. Hence, each of compression units in a pixel data group may undergo variable-length coding, such that compression results of the compression units may have different lengths. However, an overall compressed data size of compression units in the pixel data group would have a fixed value due to the fixed compression ratio CR well controlled by the rate controller 115. Hence, fixed-sized compressed pixel data groups are generated from the compressor 114. Based on the fixed compression ratio CR, a boundary between consecutive compressed pixel data groups can be easily known. That is, the start of an independently decodable compressed pixel data group in the bitstream BS can be identified.

When the bitstream BS with compressed pixel data groups each generated by completely enabled rate control is received by a driver IC (e.g., driver IC 104_N), the driver IC controller 121 may refer to the fixed compression ratio CR to know the arrangement of compressed data partitions in the payload portion of the bitstream BS. Hence, after the compressed pixel data groups $D_1'$-$D_N'$ are sequentially un-packed/un-packetized from the bitstream BS, the driver IC controller 121 determines the location of the desired compressed pixel data group $D_N'$ to be de-compressed, and instructs the de-compressor 124 to skip/discard compressed pixel data groups $D_1'$-$D_{N-1}'$ and directly de-compress the desired compressed pixel data group $D_N'$. With the help of the rate controller 115 that performs completely enabled rate control upon compression of each pixel data group to make a corresponding compressed pixel data group have a fixed compression ratio, the compressed pixel data groups can be randomly accessed by the driver ICs 104_1-104_N.

Figure 13:
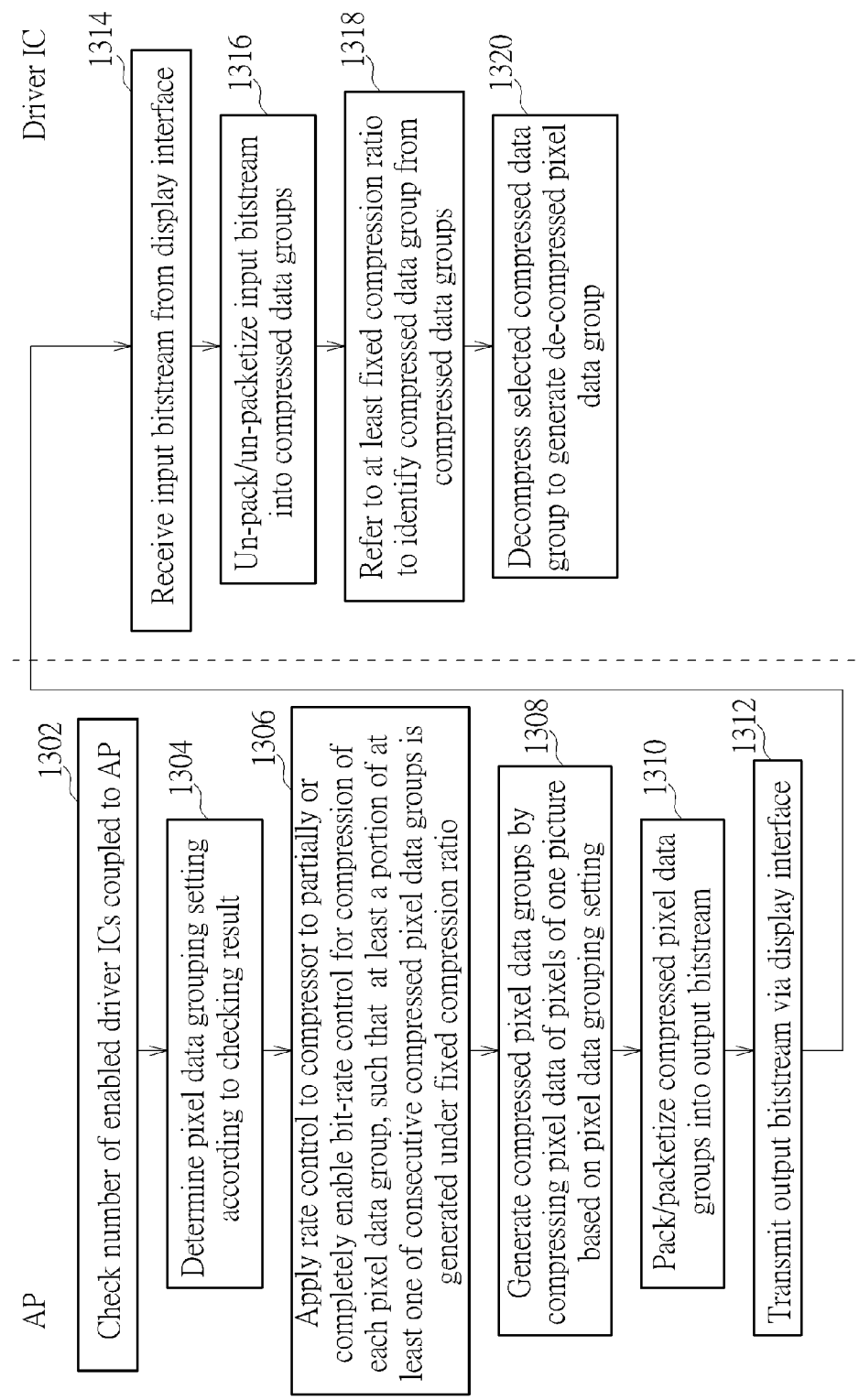
FIG. 13 is a flowchart illustrating yet another control and data flow of the data processing system shown in FIG. 1 according to an embodiment of the present invention.

FIG. 13 is a flowchart illustrating yet another control and data flow of the data processing system 100 shown in FIG. 1 according to an embodiment of the present invention. Provided that the result is substantially the same, the steps are not required to be executed in the exact order shown in FIG. 13. The exemplary control and data flow may be briefly summarized by following steps.

Step 1302: Check the number of enabled driver ICs coupled to an application processor.

Step 1304: Determine a pixel data grouping setting according to a checking result. For example, when the checking result indicates that N driver ICs are enabled to drive different display regions of the same display screen, the pixel data grouping setting may be determined based on the exemplary arrangement of image partitions $A_1$-$A_N$ in the picture IMG, as shown in FIG. 1.

Step 1306: Apply rate control to a compressor to partially or completely enable bit-rate control for compression of each pixel data group, such that at least a portion (i.e., part or all) of at least one of consecutive compressed pixel data groups is generated under a fixed compression ratio.

Step 1308: Generate a plurality of compressed pixel data groups by compressing pixel data of a plurality of pixels of one picture based on the pixel data grouping setting of the picture.

Step 1310: Pack/packetize the compressed pixel data groups into an output bitstream.

Step 1312: Transmit the output bitstream via a display interface.

Step 1314: Receive an input bitstream from the display interface.

Step 1316: Un-pack/un-packetize the input bitstream into a plurality of compressed data groups.

Step 1318: Refer to at least the fixed compression ratio to identify a compressed data group from the compressed data groups.

Step 1320: Decompress the selected compressed data group to generate a de-compressed pixel data group.

It should be noted that steps 1302-1312 are performed by the application processor (AP) 102, and steps 1314-1320 are performed by one of the driver ICs 104_1-104_N. As a person skilled in the art can readily understand details of each step shown in FIG. 13 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data processing apparatus, comprising:
a compressor, configured to generate a plurality of compressed pixel data groups by compressing pixel data of a plurality of pixels of a picture based on a pixel data grouping setting of the picture;
a rate controller, configured to perform bit-rate control; and an output interface, configured to pack the compressed pixel data groups into an output bitstream, and output the output bitstream via a display interface;

wherein a first compressed pixel data group in the output bitstream comprises a first portion that is not at a boundary between the first compressed pixel data group and a second compressed pixel data group consecutively packed in the output bitstream, and further comprises a second portion that is at the boundary between the first compressed pixel data group and the second compressed pixel data group consecutively packed in the output bitstream;

wherein the first portion in the output bitstream is generated by applying variable-length coding to first compression units each composed of a plurality of pixels under a condition that the bit-rate control is enabled; and the second portion in the output bitstream is generated by applying fixed-length coding to second compression units each composed of a plurality of pixels under a condition that the bit-rate control is disabled.

2. The data processing apparatus of claim 1, wherein the display interface is a display serial interface (DSI) standardized by a Mobile Industry Processor Interface (MIPI) or an embedded display port (eDP) standardized by a Video Electronics Standards Association (VESA).

3. The data processing apparatus of claim 1, wherein the data processing apparatus further comprises:
a controller, configured to check a number of another data processing apparatuses coupled to the data processing apparatus via the display interface, and determine the pixel data grouping setting of the picture in response to a checking result.

4. The data processing apparatus of claim 1, wherein the first compressed pixel data group in the output bitstream further comprises a third portion at a boundary between a third compressed pixel data group and the first compressed pixel data group that are consecutively packed in the output bitstream, and the third portion in the output bitstream is generated by applying fixed-length coding to third compression units each composed of a plurality of pixels under a condition that the bit-rate control is disabled.

5. A data processing apparatus, comprising:
an input interface, configured to receive an input bitstream from a display interface, and un-pack the input bitstream into a plurality of compressed pixel data groups of a picture, wherein a first compressed pixel data group in the input bitstream comprises a first portion that is not at a boundary between the first compressed pixel data group and a second compressed pixel data group consecutively packed in the input bitstream, and further comprises a second portion that is at the boundary between the first compressed pixel data group and the second compressed pixel data group consecutively packed in the input bitstream;
a controller, configured to identify a compressed pixel data group from the compressed pixel data groups according to at least the fixed compression ratio; and
a de-compressor, configured to de-compress the compressed pixel data group to generate a de-compressed pixel data group;
wherein the first portion in the input bitstream is generated by applying variable-length coding to first compression units each composed of a plurality of pixels under a condition that bit-rate control is enabled; and the second portion in the input bitstream is generated by applying fixed-length coding to second compression units each composed of a plurality of pixels under a condition that the bit-rate control is disabled.

6. The data processing apparatus of claim 5, wherein the display interface is a display serial interface (DSI) standardized by a Mobile Industry Processor Interface (MIPI) or an embedded display port (eDP) standardized by a Video Electronics Standards Association (VESA).

7. The data processing apparatus of claim 5, wherein the first compressed pixel data group in the input bitstream further comprises a third portion at a boundary between a third compressed pixel data group and the first compressed pixel data group that are consecutively packed in the input bitstream, and the third portion in the input bitstream is generated by applying fixed-length coding to third compression units each composed of a plurality of pixels under a condition that the bit-rate control is disabled.

8. A data processing method, comprising:
generating a plurality of compressed pixel data groups by compressing pixel data of a plurality of pixels of a picture based on a pixel data grouping setting of the picture;
performing bit-rate control; and
packing the compressed pixel data groups into an output bitstream, and outputting the output bitstream via a display interface;
wherein a first compressed pixel data group in the output bitstream comprises a first portion that is not at a boundary between the first compressed pixel data group and a second compressed pixel data group consecutively packed in the output bitstream, and further comprises a second portion that is at the boundary between the first compressed pixel data group and the second compressed pixel data group consecutively packed in the output bitstream;
wherein the first portion in the output bitstream is generated by applying variable-length coding to first compression units each composed of a plurality of pixels under a condition that the bit-rate control is enabled; and the second portion in the output bitstream is generated by applying fixed-length coding to second compression units each composed of a plurality of pixels under a condition that the bit-rate control is disabled.

9. The data processing method of claim 8, wherein the first compressed pixel data group in the output bitstream further comprises a third portion at a boundary between a third compressed pixel data group and the first compressed pixel data group that are consecutively packed in the output bitstream, and the third portion in the output bitstream is generated by applying fixed-length coding to third compression units each composed of a plurality of pixels under a condition that the bit-rate control is disabled.

10. A data processing method, comprising:
receiving an input bitstream from a display interface, and un-packing the input bitstream into a plurality of compressed pixel data groups of a picture, wherein a first compressed pixel data group in the input bitstream comprises a first portion that is not at a boundary between the first compressed pixel data group and a second compressed pixel data group consecutively packed in the input bitstream, and further comprises a second portion that is at the boundary between the first compressed pixel data group and the second compressed pixel data group consecutively packed in the input bitstream;

identifying a compressed pixel data group from the compressed pixel data groups according to at least the fixed compression ratio; and de-compressing the compressed pixel data group to generate a de-compressed pixel data group;

wherein the first portion in the input bitstream is generated by applying variable-length coding to first compression units each composed of a plurality of pixels under a condition that bit-rate control is enabled; and the second portion in the input bitstream is generated by applying fixed-length coding to second compression units each composed of a plurality of pixels under a condition that the bit-rate control is disabled.

11. The data processing method of claim 10, wherein the first compressed pixel data group in the input bitstream further comprises a third portion at a boundary between a third compressed pixel data group and the first compressed pixel data group that are consecutively packed in the input bitstream, and the third portion in the input bitstream is generated by applying fixed-length coding to third compression units each composed of a plurality of pixels under a condition that the bit-rate control is disabled.

* * * * *